US006665316B1

(12) United States Patent
Eidson

(10) Patent No.: US 6,665,316 B1
(45) Date of Patent: Dec. 16, 2003

(54) ORGANIZATION OF TIME SYNCHRONIZATION IN A DISTRIBUTED SYSTEM

(75) Inventor: John C. Eidson, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/162,609

(22) Filed: Sep. 29, 1998

(51) Int. Cl.[7] .................................................. H04J 3/06
(52) U.S. Cl. ........................................ 370/509; 375/356
(58) Field of Search ................................ 370/498, 503, 370/509, 510, 512, 516, 519; 709/400; 710/61, 107, 110, 119; 375/356, 354, 357

(56) References Cited

U.S. PATENT DOCUMENTS

| | | | | |
|---|---|---|---|---|
| 4,815,110 A | * | 3/1989 | Benson et al. | 375/356 |
| 5,566,180 A | * | 10/1996 | Eidson et al. | 370/473 |
| 5,870,441 A | * | 2/1999 | Cotton et al. | 327/144 |
| 6,052,726 A | * | 4/2000 | Fontenot | 709/224 |
| 6,212,171 B1 | * | 4/2001 | LaFollette et al. | 370/257 |

* cited by examiner

Primary Examiner—Kenneth Vanderpuye
Assistant Examiner—Bob A. Phunkulh

(57) ABSTRACT

A distributed system with mechanisms for automatic selection of master and slave clocks to be used for clock synchronization. The distributed system includes a set of nodes, including a first node and a second node, each having a local clock and a set of information pertaining to the local clock. The first node transfers a packet on a communication link that carries the information. The second node receives the packet on the communication link and determines whether the local clock of the second node is a master clock that synchronizes a time value in the local clock of the first node or a slave clock that synchronizes to a time value from the local clock in the first node by comparing the information in the packet to the information pertaining to the local clock in the second node. Automatic selection of master and slave clocks in boundary nodes is provided along with mechanisms for determining clock synchronization delays and mechanisms for reporting jitter associated with communication devices.

15 Claims, 5 Drawing Sheets

ORGANIZATION OF TIME SYNCHRONIZATION IN A DISTRIBUTED SYSTEM

BACKGROUND OF THE INVENTION

1. Field of Invention

The present invention pertains to the field of distributed systems. More particularly, this invention relates to organization of time synchronization in a distributed system.

2. Art Background

Distributed control systems are commonly arranged as a collection of nodes which are interconnected via one or more network communication links. These network communication links may be packetized links such as Ethernet or one or more of a variety of other packetized links, that are adapted to distributed control system applications.

Distributed control systems commonly benefit from precise control of the timing at the distributed nodes. U.S. Pat. No. 5,566,180 of Eidson et. al. teaches a method and apparatus for providing precise control of timing in distributed nodes by synchronizing the local clocks in the distributed nodes. The techniques taught by Eidson et al use a master clock/slave clock synchronization protocol. It would be desirable to provide a technique that allows the distributed nodes to automatically select which are the master nodes and which are the slave nodes at startup and as new nodes are installed or removed or temporarily disabled. This would reduce the administrative overhead needed to maintain the distributed system. It is also desirable that such automatic selection of master and slave nodes minimally impact the communication in the distributed system.

SUMMARY OF THE INVENTION

A distributed system is disclosed with mechanisms for automatic selection of the master and slave clocks used for clock synchronization. The distributed system includes a set of nodes, including a first node and a second node, each having a local clock and a set of information pertaining to the local clock. The first node transfers a packet on a communication link that carries the information pertaining to the local clock in the first node. The second node receives the packet on the communication link and determines whether the local clock in the second node is to be a master clock that synchronizes a time value in the local clock of the first node or a slave clock that synchronizes to a time value from the local clock in the first node. The second node makes this determination by comparing the information in the packet to the information pertaining to the local clock in the second node.

Also disclosed is automatic selection of master and slave clocks in boundary nodes that couple together different subnets of nodes. In addition, mechanisms for determining clock synchronization delays and mechanisms for reporting jitter associated with communication devices are disclosed.

The present techniques enable a set of substantially similar code to execute in each of the nodes with some modification for boundary nodes which are slightly different due to their multi-sided structure. These techniques also, provide for minimal network traffic and tolerate and correct for the appearance or disappearance of individual nodes in the system.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
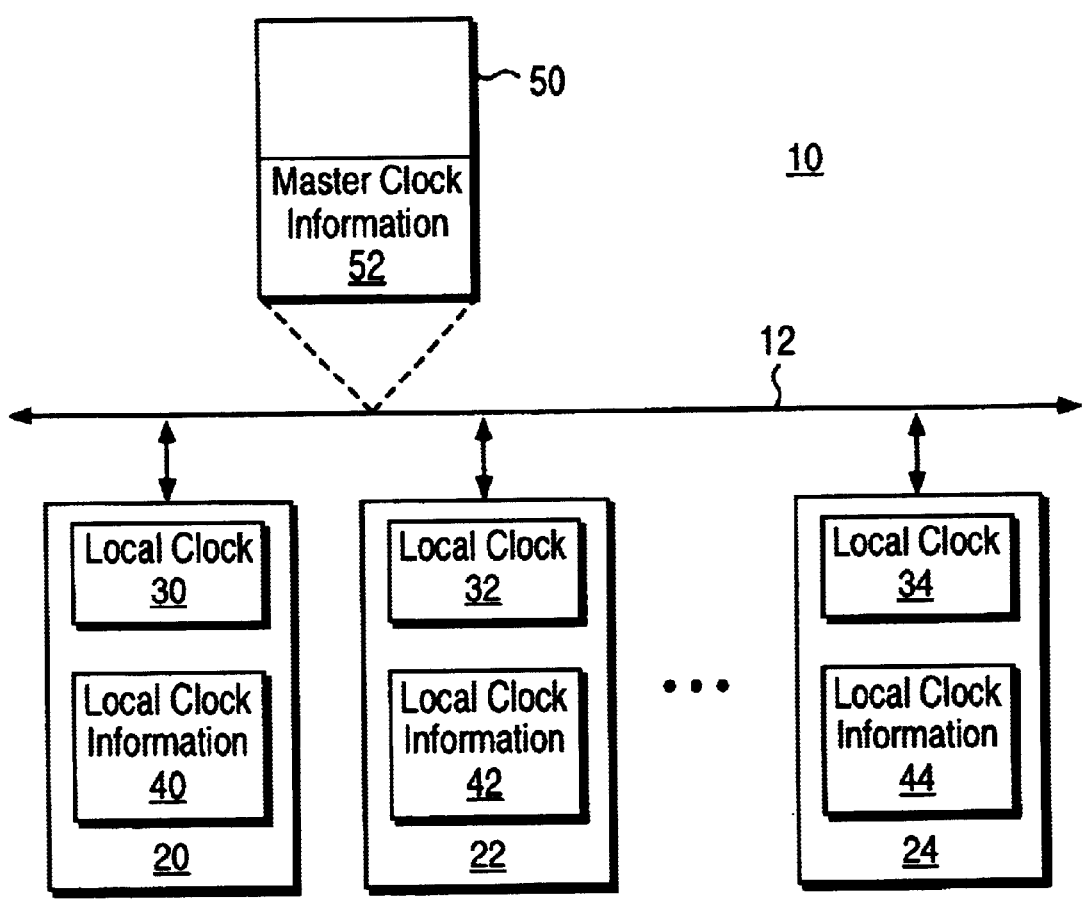
FIG. 1 shows a distributed system which embodies techniques for automatic selection of master and slave clocks for use with clock synchronization.

FIG. 1 shows a distributed system 10 which embodies techniques for automatic selection of the master and slave clocks for use in clock synchronization among a set of nodes 20–24 coupled to a communication link 12. The nodes 20–24 include a set of local clocks 30–34, respectively. The local clocks 30–34 keep local time for the respective nodes 20–24.

Each of the nodes 20–24 includes elements that support a predetermined synchronization protocol for synchronizing the local clocks 30–34. According to the predetermined synchronization protocol, one of the nodes 20–24 functions as a master clock for the distributed system 10 and the remaining ones of the nodes 20–24 function as slave clocks. The one of the nodes 20–24 that is the master clock periodically generates a timing data packet and transfers it via the communication link 12. Each one of the nodes 20–24 that is a slave clock receives the timing data packet and in response latches a local time value from its local clock 30–34. The node 20–24 that is the master clock generates a follow up packet for each Liming data packet and transfers it via the communication link 12. Each follow up packet includes a time-stamp. Each node that is a slave clock receives the follow up packet and compares the time-stamp to the latched local time value. Each node that is a slave clock uses the difference between the time-stamp and the latched local time value to adjust its local clock 30–34.

In one embodiment, the predetermined synchronization protocol and related mechanisms implemented in the nodes 20–24 are those described in U.S. Pat. No. 5,566,180. For example, each of the nodes 20–24 may include circuitry for latching a local time value when a timing data packet is recognized. Each of the slave clocks may include circuitry for adjusting its respective local clock 30–34 based upon computations of the sending and receiving time of the timing data packets which are transferred over the communication link 12. The adjustment of a stored time value may be accomplished by implementing each local clock 30–34 as a counter driven by an oscillator with sufficient stability. The least significant few bits of the counter may be implemented as an adder so that the increment on oscillator periods may be occasionally increased or decreased to effectively speed up or slow down a local clock in accordance with the results of the computation.

The nodes 20–24 may be any type of node in the distributed system 10. For example, any one or more of the nodes 20–24 may be a sensor node or an actuator node or an application controller node or a combination of these in a distributed control system. Any one or more of the nodes 20–24 may be a computer system such as a personal computer with the processor being used to calculate clock adjustment parameters.

The communication link 12 may be implemented with one or more of a variety of communication mechanisms. In one embodiment, the communication link 12 is an Ethernet communication network. In another embodiment, the communication link 12 is a LonTalk field-level control bus which is specialized for the process control environment. In other embodiments, the communication link 12 may be implemented with time division multiple access (TDMA) or token ring protocols to name only a few possibilities.

The nodes 20–24 implement methods for determining which of the nodes 20–24 is to function as the master clock for the distributed system 10. These methods make use of sets of local clock information 40–44 contained in the nodes 20–24, respectively. The local clock information 40–44 provides information pertaining to the local clocks 30-32, respectively.

Each of the nodes 20–24 initially assumes that it is the master clock and begins transferring timing data packets via the communication link 12. Each timing data packet carries the local clock information 40–44 from the originating node 20–24. In response to a timing data packet, the nodes 20–24 compare the local clock information contained in the timing data packet to the corresponding local clock information 40–44 to determine whether a "better" master clock is transmitting. If a better master clock is detected by a node, then that node assumes the role of a slave clock and stops generating timing data packets.

For example, at startup the node 20 assumes that it is the master clock of the distributed system 10. This may be during the initialization of the distributed system 10 or when the node 20 is installed or restarts after removal or failure or loss of communication, etc. As the master clock, the node 20 periodically generates a timing data packet, such as a timing data packet 50, and transfers it via the communication link 12. The timing data packet 50 carries a set of master clock information 52 obtained from the local clock information 40. The nodes 22–24 receive the timing data packet 50 and compare the master clock information 52 to the local clock information 42–44, respectively, to determine whether the node 20 has a better clock for the purposes of selecting a master clock for the distributed system 10.

The local clock information 40 may include an indication of whether the local clock 30 is driven by a standard time source. A standard time source may be a global positioning system (GPS) receiver or radio broadcast time source such as WWV or an atomic clock associated with the node 20. The local clock information 40 may include an indication of whether the local clock 30 appears to be functional and within specification.

The local clock information 40 may include an indication of whether the local clock 30 is traceable to a standard clock such as a GPS receiver. For example, the local clock 30 may be a very accurate clock such as an atomic clock that was at one time synchronized to a standard time source. If so, the accuracy of the local clock 30 would allow it to maintain time that is traceable to a standard clock with a high degree of accuracy even after communication with the standard clock is lost.

The local clock information 40 may include an estimate of the accuracy and/or jitter associated with the local clock 30. The local clock information 40 may include a unique identifier associated with the local clock 30. The local clock information 40 may include an indication of whether the local clock 30 is a boundary clock in a boundary node that links together subnets.

Figure 2:
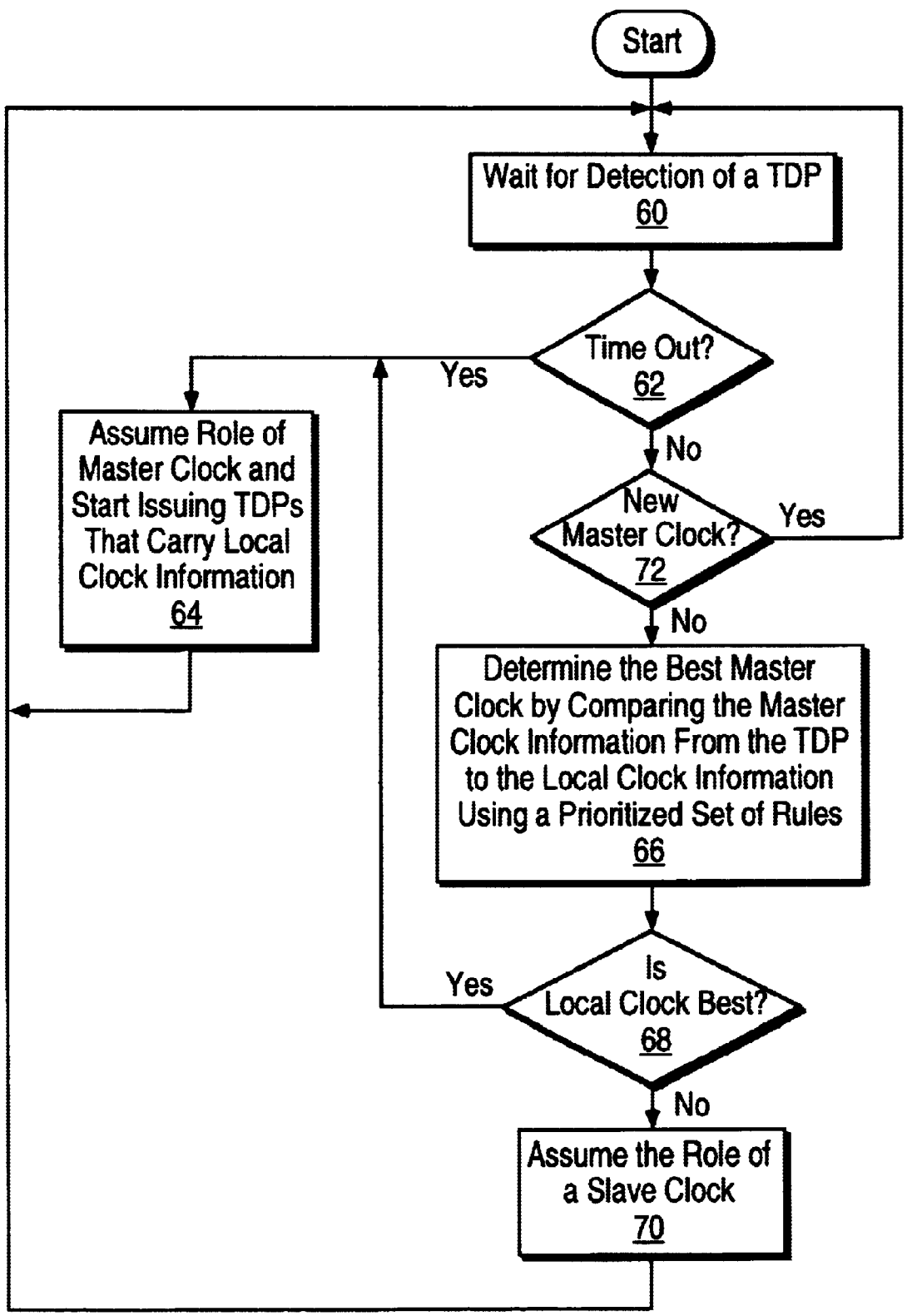
FIG. 2 shows one embodiment of a method for determining which of the nodes is to function as the master clock for the distributed system.

FIG. 2 shows one embodiment of a method for determining which of the nodes 20–24 is to function as the master clock for the distributed system 10. The method steps shown are implemented in each of the nodes 20–24 and are discussed for the node 24.

At step 60, the node 24 waits for the detection of a timing data packet (TDP) on the communication link 12. At step 62, if no TDP is detected within a predetermined timeout interval then control proceeds to step 64. Otherwise, control proceeds to step 72.

At step 64, the node 24 assumes the role of master clock, if not already in the role of the master clock, and begins issuing TDPs over the communication link 12 at regular intervals. Each TDP issued by the node 24 carries the local clock information 44 as master clock information to be used by receiving nodes 20–22 in evaluating which is the better master clock. The node 24 then proceeds back to step 60 to detect TDPs from one of the nodes 20–22 which may be a better master clock. At step 72, the node 24 determines whether the TDP detected at step 60 originated with a new master clock. A new master clock is a master clock that has previously issued fewer than a predetermined number of TDPs which were detected by the node 24. The node 24 may determine whether TDPs were previously received from particular master clocks by logging the UIDs contained in the TDPs and recording counts associated with the UIDs logged. If it is a new master clock at step 72 then the UID of TDP detected at step 60 is logged and a count associated with that UID is incremented. The TDP is ignored and control proceeds back to step 60 to detect another TDP. If it is not a new master clock then control proceeds to step 66.

At step 66, the node 24 determines whether the local clock 44 or the local clock of the node that originated the TDP detected at step 60 is the best master clock. Assume in the following that the TDP detected at step 60 is the timing data packet 50. At step 66, the node 24 determines the best master clock by comparing the master clock information 52 to the local clock information 44 using a prioritized set of rules.

In an example embodiment, the prioritized set of rules include a first rule which involves a determination of whether the master clock information 52 or the local clock information 44 indicate a standard time source. If the master clock information 52 indicates a standard time source and the local clock information 44 does not then the local clock 34 is not the best master clock. If the local clock information 44 indicates a standard time source and the master clock information 52 does not then the local clock 34 is the best master clock at step 66. If both the master clock information 52 and the local clock information 44 indicate a standard time source then the best standard time source is selected at step 66 according to a predetermined stratum of standard clocks. For example, a GPS time source may outrank a WWV time source, etc. If the first rule fails to resolve which is the best master clock then a second rule is used at step 66.

In the example embodiment, the second rule involves a determination of whether the master clock information 52 or the local clock information 44 indicate a traceable time source. If the master clock information 52 indicates a traceable time source and the local clock information 44 does not then the local clock 34 is not the best master clock. If the local clock information 44 indicates a traceable time source and the master clock information 52 does not then the local clock 34 is the best master clock at step 66. If the second rule fails to resolve which is the best master clock then a third rule is used at step 66.

In the example embodiment, the third rule involves a determination of whether the master clock information 52 or the local clock information 44 indicate a boundary clock. If the master clock information 52 indicates a boundary clock and the local clock information 44 does not then the local clock 34 is not the best master clock. If the local clock information 44 indicates a boundary clock and the master clock information 52 does not then the local clock 34 is the best master clock at step 66. If the third rule fails to resolve which is the best master clock then a fourth rule is used at step 66.

In the example embodiment, the fourth rule involves a determination of whether the master clock information 52 or the local clock information 44 indicates a better clock accuracy. If the master clock information 52 indicates a better accuracy than the local clock information 44 then the local clock 34 is not the best master clock. If the local clock information 44 indicates a better accuracy than the master clock information 52 then the local clock 34 is the best master clock at step 66. If the fourth rule fails to resolve which is the best master clock then a fifth rule is used at step 66.

In the example embodiment, the fifth rule is a tie breaker. For example, the clock with the lowest UID indicated in the master clock information 52 and the local clock information 44 may be selected as the best master clock at step 66.

Figure 3:
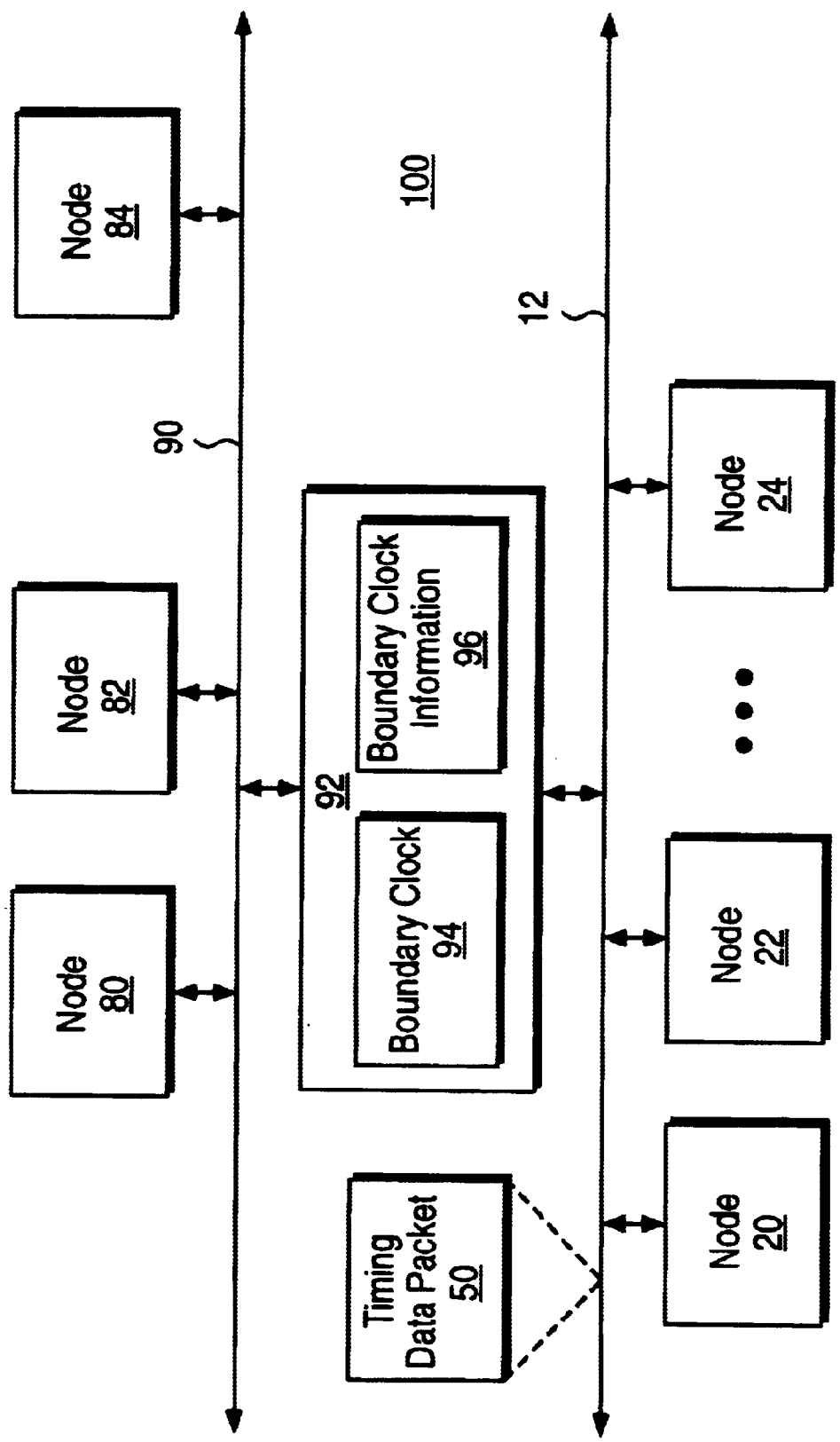
FIG. 3 shows a distributed system that includes sub-nets coupled to a boundary node.

FIG. 3 shows a distributed system 100 that includes one sub-net having a set of nodes 80–84 coupled to a communication link 90 and another sub-net that includes the nodes 20–24 coupled to the communication link 12. The distributed system 100 includes a boundary node 92 coupled between the communication links 90–12. A first side of the boundary node 92 corresponds to the subnet of the communication link 12 and a second side corresponds to the subnet of the communication link 90. A boundary node in general has n sides for linking to n subnets.

The boundary node 92 includes a boundary clock 94 which may assume the role of master clock on the first or the second side of the boundary node 92 or on both the first and second sides. The boundary clock 94 may also assume the role of a slave clock on either the first or the second sides of the boundary node 92. A boundary clock in a boundary node in general assumes the role of a slave clock on at most one of its sides.

The boundary node 92 implements the method steps 60–72 and participates in the selection of the best master clock on both its first and second sides independently. The boundary node 92 transfers timing data packets that carry a set of boundary clock information 96 via the communication link 12 when determining which is the best master clock on the first side. Similarly, the boundary node 92 transfers timing data packets that carry the boundary clock information 96 via the communication link 90 when determining which is the best master clock on the second side.

The boundary node 92 includes circuitry for adjusting the boundary clock 94 from either the first or second side depending on which side, if any, the boundary clock 94 assumes the role of slave clock. In addition, the boundary node 92 includes circuitry for distributing time values using timing data packets and follow up packets to the first and/or second sides depending on which sides the boundary clock 94 assumes the role of master clock.

If the boundary clock 94 assumes the role of a slave clock on one of the sides of the boundary node 92 then it distributes the master clock information from the best clock on its slave side to the remaining subnet when determining the best master on the remaining subnet. For example, assume that the best clock on the subnet of the first side of the boundary node 92 is the local clock 30 in the node 20. The boundary clock 94 as a consequence of this assumes the role of slave clock to the local clock 30 and adjusts its time to synchronize to a time value distributed using the timing data packet 50 and a corresponding follow up packet on the communication link 12. Under such conditions, when the boundary node 92 transfers a timing data packet via the communication link 90 it includes the master clock information 52 from the node 20 in the timing data packet. As a consequence, the boundary clock 94 may assume the role of master clock on the second side of the boundary node 92 based on the clock information associated with the local clock 30 rather than the boundary clock information 96. This enables the boundary clock 94 to inherit the characteristics of the best master clock to which it is a slave on one subnet for the purposes of evaluating its suitability as a master clock on another subnet.

Figure 4:
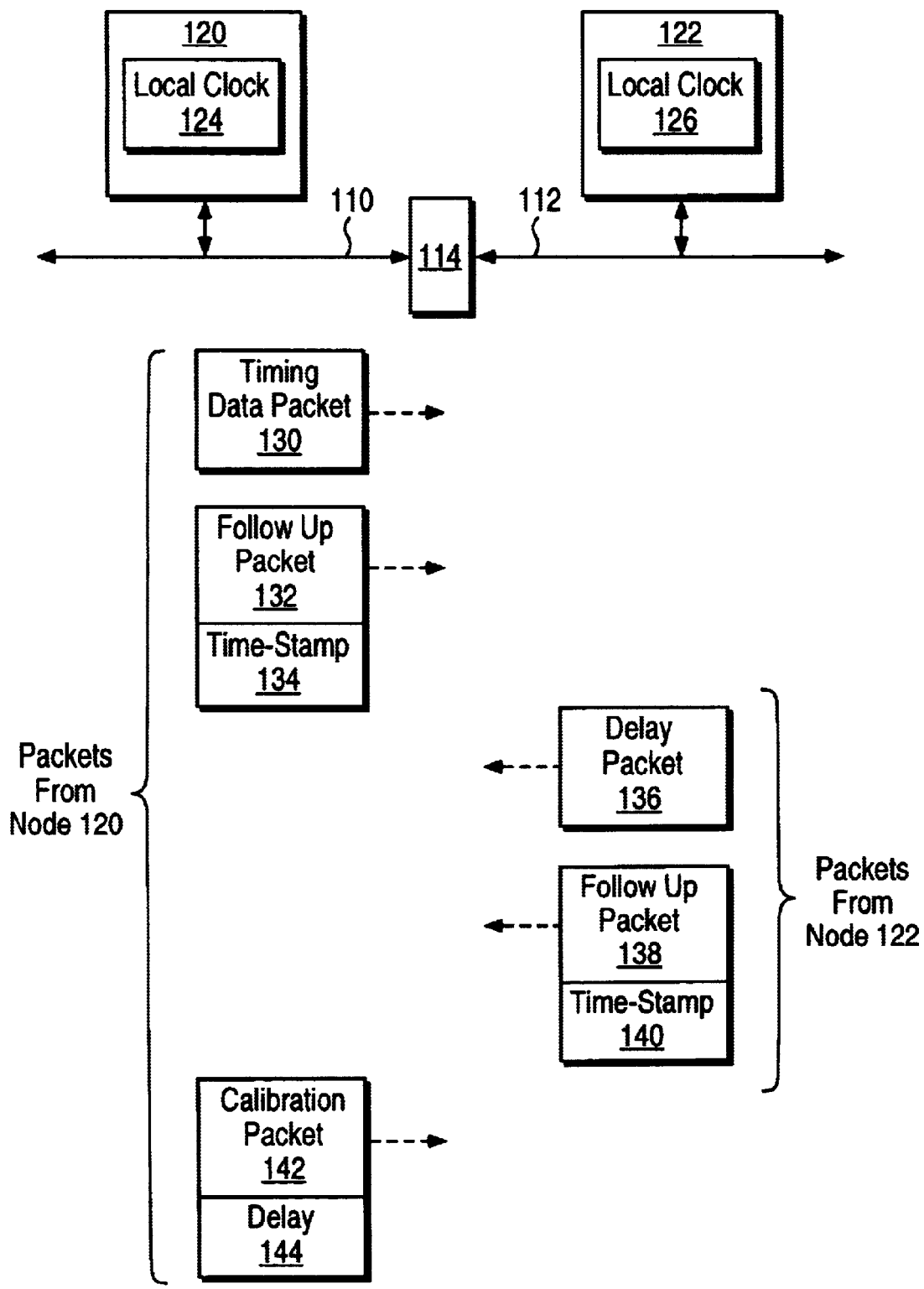
FIG. 4 shows an arrangement for determining a delay associated with the transfer of timing data packets between a pair of nodes.

FIG. 4 shows an arrangement for determining a delay associated with the transfer of timing data packets between a pair of nodes 120–122. The delay includes the propagation delay on a pair of communication links 110–112 and the delay associated with an intervening communication device 114. The communication device 114 in one embodiment is a repeater and in other embodiments may be a gateway or router or switching hub or similar device. The arrangement shown enables a correction for this delay and an improvement in the accuracy of time synchronization between a pair corresponding local clocks 124–126.

It is assumed that the node 120 is the master clock and the node 122 is the slave clock and that the delay is symmetrical between the nodes 120–122. Initially, the normal synchronization protocol which is described in U.S. Pat. No. 5,566,180 is run to reach syntonization between the local clocks 124–126. Syntonization means that the local clocks 124–126 run at substantially the same speed although they may not hold the same time. Accordingly, the nodes 120–122 include time packet recognizers that obtain local time values from the local clocks 124–126, respectively, when timing data packets are transmitted and received. The nodes 120–122 also include means for generating timing data packets and follow up packets and processing means for computing differences between time-stamps tarried in follow up packets and time values obtained from the local clocks 124–126 and means for adjusting the local clocks 124–126 in response to the computed differences.

The node 120 generates a timing data packet 130 and transfers it via the communication link 110. The node 120 then generates a follow up packet 132 that carries a time-stamp 134. The time-stamp 134 is a time value sampled from the local clock 124 when the timing data packet 130 was generated. The timing data packet 130 when received via the communication link 112 causes the node 122 to sample a time value from the local clock 126. The node 122 then determines an apparent delay ($D_1$) from the node 120 to the node 122 by computing a difference between the time value sampled from the local, clock 126 and the time-stamp 134.

Thereafter, the node 122 transfers a delay packet 136 and then a follow up packet 138 via the A communication link 112. The follow-up packet 138 carries a time-stamp 140 which is a time value sampled from the local clock 126, when the delay packet 136 was generated. In one embodiment, the delay packet 136 is a timing data packet with a special delay flag set. The delay flag indicates to other nodes that the delay packet 136 should be ignored by slave clocks and should not be used to determine a best master clock.

The delay packet 136 when received via the communication link 110 causes the node 120 to sample a time value from the local clock 124. The node 120 then determines an apparent delay ($D_2$) from the node 122 to the node 120 by computing a difference between the time value sampled from the local clock 124 when the delay packet 136 was received and the time-stamp 140.

Thereafter, the node 120 transfers a calibration packet 142 via the communication link 110. The calibration packet 142 carries a delay 144 equal to the apparent delay $D_2$. The node 122 receives the calibration packet 142 via the communication link 112 and determines the overall delay between the nodes 120 and 122 by computing an average of $D_1$ and $D_2$. The overall delay may then be used by the node 122 as a slave clock when it adjusts the local clock 126 to correct for the delay between the node 120 and 122.

In one embodiment, the nodes 120–122 perform the calibration procedure set forth above on a periodic basis to correct for time variation in the delay. The calibration procedure in different slave clocks may be staggered so that all slave clocks don't try to calibrate at the same time and cause excessive network traffic. Slave clocks may be staggered using a random number generator to start the first calibration sequence after a node reset.

Figure 5:
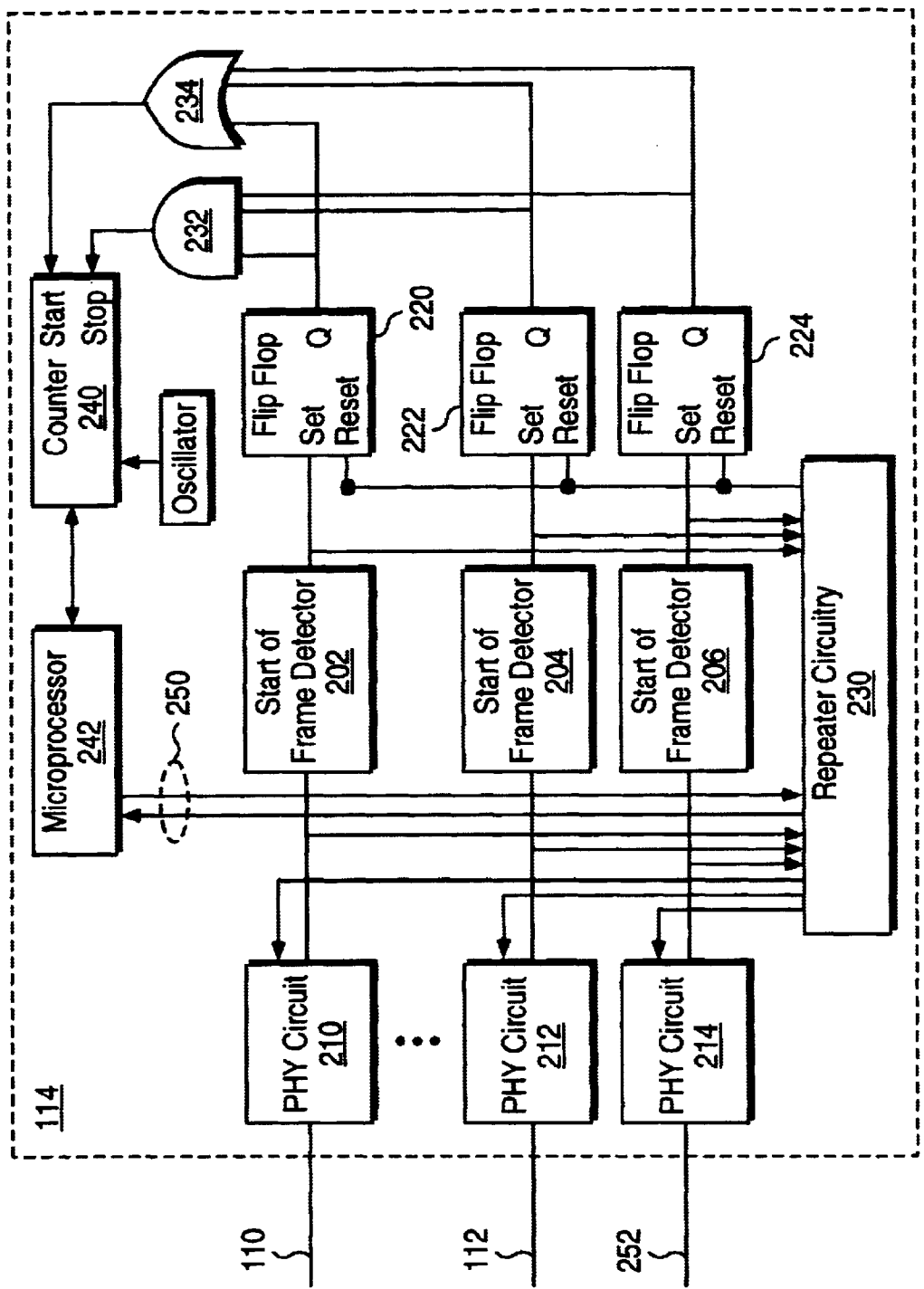
FIG. 5 shows a communication device which includes mechanisms for determining and reporting the amount of jitter introduced in the communication device.

FIG. 5 shows an embodiment of the communication device 114 which includes mechanisms for determining and reporting the amount of jitter introduced by the communication device 14. The arrangement shown enables a correction for the reported jitter and an improvement in the accuracy of time synchronization in between the local clocks 124–126.

The communication device 14 includes a set of physical interface (PHY) circuits 210–214 that interface to the communication links 110–112 and additional communication links such as a communication link 252. The PHY circuits 210–214 recover data and clock signals from transmissions received via the communication links 110–112 and 252 and provide the recovered data and clock signals to a set of start of frame detectors 202–206, respectively, and to repeater circuitry 230.

One of the start of frame detectors 202–206 detects the start of an incoming packet on a corresponding one of the communication links 110–112 and 252 and sets a corresponding flip flop 220–224. The set one of the flip flops 220–224 starts a counter 240 through an or gate 234. The remaining start of frame detectors 202–206, detect the start of outgoing packets on the corresponding communication links 110–112 and 252 and set corresponding flip flops 220–224. When all of the flip flops 220–224 are set the counter 240 is stopped using an and gate 232. Thereafter the counter 240 holds a count that indicates a difference between the time of entry of a packet to the communication device 114 and the time that the last repeated packet is transferred out of the communication device 114.

For example, the start of fra me detector 202 detects the start of the timing data packet 130 which is received via the communication link 110 and sets the flip flop 220 which starts the counter 240. The repeater circuitry 230 retransmits the timing data packet 130 via the communication links 112 and 252 using the PHY circuits 212 and 214. The start of frame detectors 204–206 detect the start of outgoing timing data packets 130 on the communication links 112 and 252 and set the flip flops 222–224. The last of the flip flops 222–224 that is set by the outgoing timing data packets 130 stops the counter 240.

The repeater 114 includes a microprocessor 242 that may perform statistical measurements on counts obtained from the counter 240. The microprocessor 242 has the capability of communication with nodes served by the repeater 114. The microprocessor 242 provides transmit data targeted for the nodes and obtains data received from the nodes via signal lines 250. The microprocessor 242 may provide results of its statistical measurements to nodes served by the repeater 114.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A distributed system, comprising:
a set of nodes coupled to a communication link, each node having a corresponding local clock for maintaining a corresponding local time value and storing a set of local clock information, each node initially assuming a role of master clock by transferring a corresponding timing data packet on the communication link that carries the local clock information;
each node when in the role of master clock determining a best master clock in response to a received timing data packet by comparing the local clock information from the received timing data packet to the corresponding stored local clock information using a prioritized set of rules including a rule pertaining to whether the local clock information indicates a standard time value, each node assuming a role of slave clock if best master clock is not the local clock such that each node in the role of slave clock synchronizes the corresponding local time value to a time value from the best master clock.

2. The distributed system of claim 1, wherein each node that assumes the role of slave clock reassumes the role of master clock if one of the timing data packets from another one of the nodes is not received within a predetermined timeout interval.

3. The distributed system of claim 1, further comprising a boundary node coupled to the communication link and a second communication link, the boundary node having a boundary clock and storing a set of boundary clock information, the boundary node initially assuming the role of master clock and when in the role of master clock determining a best master clock in response to a received timing data packet on each of the communication links by comparing the local clock information from each received timing data packet to the boundary clock information using the prioritized set of rules and assuming the role of slave clock if the best master clock is not the boundary clock.

4. The distributed system of claim 1, wherein the prioritized set of rules include a first rule which includes a determination of whether the local clock information in the received timing data packet or the stored local clock information indicate a standard time source.

5. The distributed system of claim 4, herein the prioritized set of rules include a second rule which includes a determination of whether the local clock information in the received timing data packet or the stored local clock information indicate a traceable time source.

6. The distributed system of claim 5, wherein the prioritized set of rules include a third rule which includes a determination of whether the local clock information in the received timing data packet or the stored local clock information indicate a boundary clock in a boundary node between the communication link and another communication link.

7. The distributed system of claim 6, wherein the prioritized set of rules include a fourth rule which includes a determination of whether the local clock information in the received timing data packet or the stored local clock information indicate a better accuracy.

8. The distributed system of claim 7, wherein the prioritized set of rules include a fifth rule which is a tie breaker.

9. A method for automatic master/slave clock selection for a clock synchronization protocol, comprising the steps of:

initially assuming a role of master clock and transferring a corresponding timing data packet on a communication link that carries a set of stored local clock information;

determining a best master clock in response to a received timing data packet when in the role of master clock by comparing the local clock information from the received timing data packet to the corresponding stored local clock information using a prioritized set of rules including a rule pertaining to whether the local clock information indicates a standard time value;

assuming a role of slave clock if best master clock is not the local clock by synchronizing a corresponding local time value to a time value from the best master clock.

10. The method of claim 9, wherein the step of assuming the role of slave clock further comprises the step of reassuming the role of master clock if one of the timing data packets is not received within a predetermined timeout interval.

11. The method of claim 9, wherein the prioritized set of rules include a first rule such that the step of comparing includes the step of determining whether the local clock information in the received timing data packet or the stored local clock information indicate a standard time source.

12. The method of claim 11, wherein the prioritized set of rules include a second rule such that the step of comparing further includes the step of determining whether the local clock information in the received timing data packet or the stored local clock information indicate a traceable time source.

13. The method of claim 12, wherein the prioritized set of rules include a third rule such that the step of comparing further includes the step of determining whether the local clock information in the received timing data packet or the stored local clock information indicate a boundary clock in a boundary node between the communication link and another communication link.

14. The method of claim 13, wherein the prioritized set of rules include a fourth rule such that the step of comparing further includes the step of determining whether the local clock information in the received timing data packet or the stored local clock information indicate a better accuracy.

15. The method of claim 14, wherein the prioritized set of rules include a fifth rule such that the step of comparing further includes the step of determining a tie breaker.

* * * * *